May 13, 1930.  V. BENDIX  1,758,731

BRAKE DRUM

Filed June 2, 1927

INVENTOR
VINCENT BENDIX
BY
ATTORNEY

Patented May 13, 1930

1,758,731

UNITED STATES PATENT OFFICE

VINCENT BENDIX, OF CHICAGO, ILLINOIS, ASSIGNOR TO BENDIX BRAKE COMPANY, OF CHICAGO, ILLINOIS, A CORPORATION OF ILLINOIS

BRAKE DRUM

Application filed June 2, 1927. Serial No. 195,995.

This invention relates to brake drums, and has for an object the provision of a very close joint between the drum and its backing plate, to protect an internal brake housed within the drum.

In one desirable arrangement, the drum has an outwardly-extending flange at its edge, which is closely encircled by a flange on the backing plate to provide a very close joint, and the drum also has an encircling part or rib (shown as a separate ring welded to the drum) which extends outwardly beyond the edge flange and which forms a very close joint with the edge of the backing plate flange.

This provides two close joints at right angles to each other, forming in effect a baffle which effectually prevents the passage of mud, water, etc.

Figure 1:
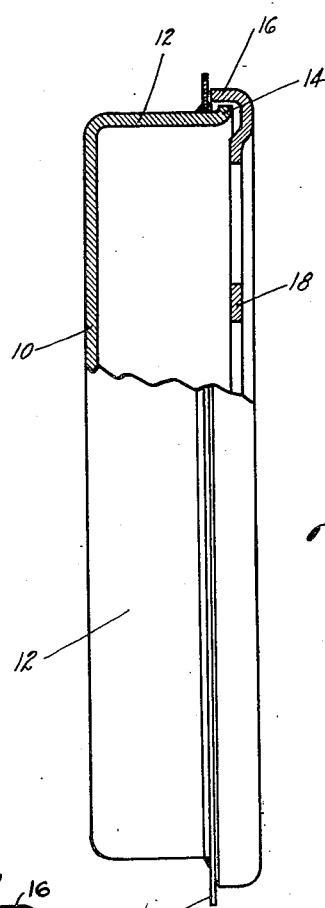
Figure 2:
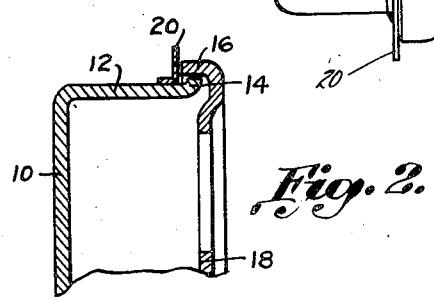

The above and other objects and features of the invention, including various novel and desirable features of construction, will be apparent from the following description of one illustrative embodiment shown in the accompanying drawing, in which:

Figure 1 is a side elevation of the drum and backing plate, partly broken away in radial section; and Figure 2 is a section similar to Figure 1 indicating a modified form of drum and backing plate assembly.

The drum is illustrated as drawn or pressed from sheet steel, with a head 10 and a cylindrical braking portion 12 with the inside of which the brake shoes (not shown) are engageable.

At the edge of the braking portion 12, the drum is formed with an outwardly-extending edge flange 14, which is relatively short, and which is closely encircled by a part 16 (preferably an integral edge flange) of a backing plate 18, thus forming one very tight joint between the drum and the backing plate.

The drum is also provided with a part, preferably a separate flat ring 20 shrunk on portion 12 and arc-welded or otherwise secured thereto, and which forms an outwardly-extending rib adjacent the flange 14. Ring 20 may, if desired, be formed with a cylindrical base flange or hoop, encircling and preferably spot-welded to the drum. Part 20 projects outwardly further than flange 14, and crosses the end of the backing plate flange 16,—i. e. the backing plate flange terminates immediately adjacent the side of ring 20,—thus forming a second very close joint between the drum and backing plate. The ring also serves the important functions of reinforcing the drum and of aiding in the radiation of heat.

It will be seen that the two joints are at right angles to each other, thus forming a baffle which effectually excludes mud and water.

While one illustrative embodiment has been described in detail, it is not my intention to limit the scope of the invention to that particular embodiment, or otherwise than by the terms of the appended claims.

I claim:

1. A brake drum having a cylindrical braking portion formed with an outwardly-directed flange at its edge and having a part encircling said portion and forming a rib adjacent said flange, in combination with a backing plate having at its outer edge an integral flange encircling said flange of the brake drum and terminating immediately adjacent the side face of said rib.

2. A brake drum having a cylindrical braking portion formed with an outwardly-directed flange at its edge and having a separate ring encircling said portion and forming a rib adjacent said flange, in combination with a backing plate having at its outer edge a part encircling said flange of the brake drum and terminating immediately adjacent the side face of said rib.

3. A brake drum having a cylindrical braking portion formed with a relatively short integral outwardly-extending flange at its edge, and having a separate baffle ring encircling said portion immediately adjacent said flange and projecting outwardly further than said flange.

4. A brake drum having a cylindrical braking portion formed with a relatively short integral outwardly-extending flange at its edge, and having a separate flat baffle ring encircling and welded at its inside edge to said portion immediately adjacent said flange and projecting outwardly further than said flange.

In testimony whereof, I have hereunto signed my name.

VINCENT BENDIX.